April 18, 1933.   L. LEYES   1,904,151
MECHANICAL MOVEMENT
Filed Jan. 20, 1930
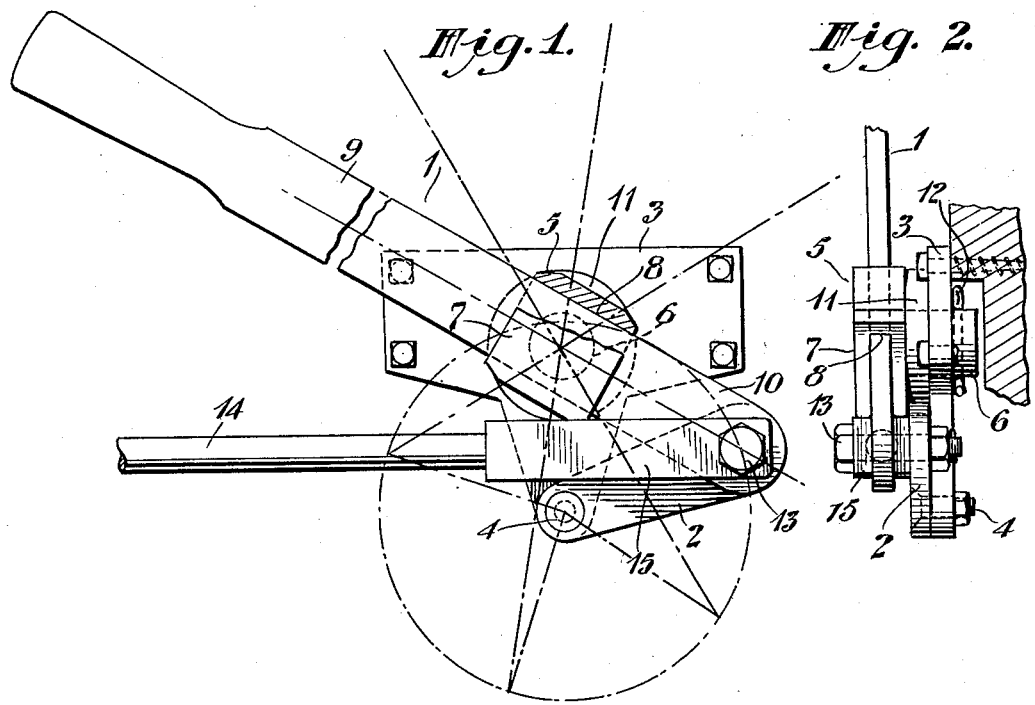
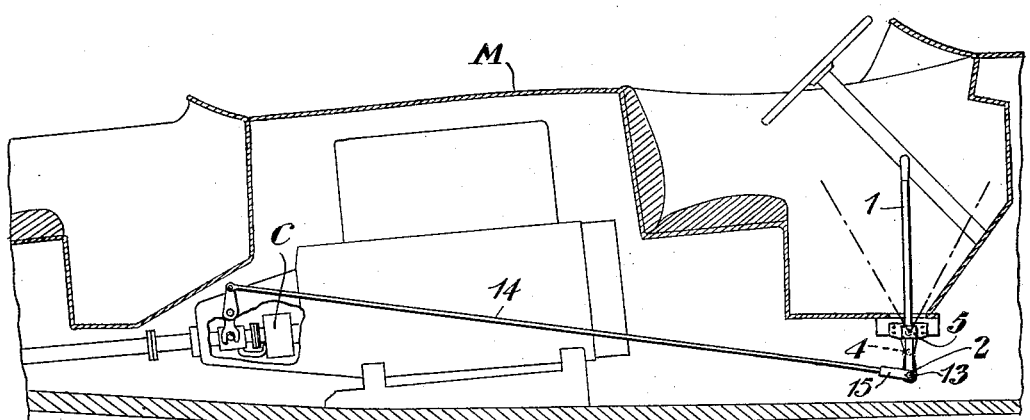
INVENTOR
LOUIS LEYES
BY
his ATTORNEYS Patented Apr. 18, 1933

1,904,151

UNITED STATES PATENT OFFICE

LOUIS LEYES, OF CITY ISLAND, NEW YORK

MECHANICAL MOVEMENT

Application filed January 20, 1930. Serial No. 422,080.

An important object of the present invention is to provide an advantageous mechanical movement of great utility.

Another important object of the invention is to provide an improved mechanical movement for operating the power transmission clutch of a motor boat or the like.

Other objects of the invention will appear hereinafter.

In the drawing, Fig. 1 is a side view, partly in section, of one form of my mechanical movement;

Fig. 2 an edge view of the form of movement shown in Fig. 1; and

Fig. 3 a longitudinal section taken through a motor boat showing the mechanical movement of Figs. 1 and 2 mounted therein and operatively connected to the power transmission clutch.

The form of my mechanical movement illustrated in Figs. 1 and 2 includes an operating member 1 in the form of a lever, and a crank 2 forming what may be called a follower member. In the present instance both of these members are pivotally mounted upon a bracket plate 3 but this mounting may be varied. The crank 2 is pivotally connected at one end to the lower portion of the bracket plate by means of a pin or bolt 4. At a point spaced directly above pivot 4 the lever 1 is pivotally connected or fulcrumed to the bracket by a pivot member 5 formed with a journal shank 6 rotatable in an aperture in the bracket, and an enlarged flat head 7. The latter is formed with a straight slot 8 extending at right angles to the pivot axis. In this slot the lever 1 is mounted for longitudinal sliding and forms a lever of the first class, with its ends extending from opposite sides of the pivot head 7 to provide a long upper arm 9 and a short lower arm 10. A washer 11 is preferably interposed between the head 7 and the bracket 3, and shank 6 is held against withdrawal from the bracket by a cotter pin 12 or other suitable means. The short arm 10 of the lever is pivotally connected at its lower end to the free end of the crank 2 by means of a bolt 13, while the long arm of the lever is formed at its upper end with a hand grip for the manual operation of the lever. It will be understood, however, that the lever may be operated by other means. Also pivotally connected to the bolt 13 which operatively connects the lever and the crank is a load or work connection. This load connection may be of any suitable form. In the present instance it is a reach rod 14 and is formed with a fork 15 which straddles the crank end and is pivoted upon the bolt 13.

The pivots 4 and 5 of the crank 2 and the lever 1 respectively are held in fixed spaced relation; the operative connection 14 between the lever and crank is constrained to swing with a fixed radius about the pivot 4, and the lever is free to slide through its pivot or fulcrum head 7. Consequently the mechanical advantage of the lever will vary in different phases of its movement. In Fig. 1 the lever is shown in one of its extreme positions with the pivot 14 between the lever and crank swung above the level of the crank pivot 5, and the fork 15 of the reach rod in contact with the head 7 of the lever fulcrum. Assuming that the reach rod is under tension this is a locking position of the parts with the reach rod just beyond dead center. When the long arm 9 of the lever is grasped and swung to the right the crank will be swung around its pivot 4 and, since the position of said pivot and the radial distance between pivot bolts 4 and 13 are both fixed, the lever must slide through its fulcrum head 7. During the early portion of the lever movement a tension will be exerted upon the reach rod until the latter reaches dead center. Thereafter a working thrust will be exerted upon the rod. It will be observed that the lever arm 10 is shortest at the beginning of its throw due to the fact that the pivot bolt 13 is then nearest the lever fulcrum. As the throw continues arm 10 is lengthened by the sliding of the lever until its length reaches a maximum, when the lever is in a vertical position. The long arm 9 is, of course, correspondingly shortened. As the opposite end of the stroke is approached the lever arm 10 is again shortened.

It will be obvious, therefore, that the greatest mechanical advantage is had near the ends of the lever strokes and that in mid stroke, when rapid movement and little force is required in the operation of many mechanisms, the mechanical advantage is least due to maximum elongation of the short lever arm and the corresponding shortening of the long arm. The mechanical advantage near the stroke ends is furthermore greatly increased by reason of the fact that near dead center the longitudinal movement of the reach rod is extremely slight as compared with the lever movement. Thus, near the end of a stroke there is a combination of maximum leverage and minimum work movement so that a light force exerted upon the lever will cause a powerful pull or thrust upon the reach rod. In the present showing I have placed the pivots 4 and 5 rather close together for greater leverage, the pivot or lever fulcrum 5 having its axis disposed within an imaginary circle described by the bolt 13. This arrangement may be varied, however. Fig. 1 shows an extreme swing of the operating lever. In many uses of the mechanical movement the angular movement of said lever will be much less.

In Fig. 3 I have shown the mechanical movement just described embodied in a motor boat M and utilized for shifting the power transmission clutch which is indicated at C. I have found this to be a particularly advantageous use of my invention. The shifting of the clutch in a motor boat is sometimes an awkward and difficult operation, particularly in the case of a high powered boat or one having a stiff clutch requiring considerable force for the final portion of its movement. In many cases, in order to obtain sufficient mechanical advantage for the manual operation of the clutch an objectionably long lever is employed, and even then great effort is often required. In other cases the manual operation is assisted by a fluid pressure operated device. My simple and compact mechanical movement greatly increases the mechanical advantage, reduces the length and throw of the lever and enables the driver to operate the clutch easily and conveniently by manual force alone.

While I have shown and described a satisfactory form of my invention I do not wish to be limited strictly to this disclosure but reserve the right to make such changes as will lie within the scope of the claims.

What I claim is:

1. A manually operable mechanical movement comprising a manually operable lever of the first class having one free handle end; a rockable follower member; a fulcrum mounting for said manually operable lever adapting it to swing and to shift transversely of its fulcrum to vary its leverage; a pivotal mounting for said follower member supported with its axis fixed with relation thereto and with relation to said fulcrum and laterally offset from the latter; a pivot joint directly and operatively connecting one end of the manually operable lever to the outer shiftable end of the follower member, said pivot joint being constrained to swing around said axis of said pivotal mounting with a fixed radius and cause the shift of the manually operable lever across its fulcrum as it is swung; and a power-transmitting element connected to said pivot joint at the outer end of the follower member, the center of the fulcrum and the center of the fixed axis of the follower member being so related to each other that when the manually operable lever extends across said two points said lever will be in its mid position and its leverage will be gradually increased as it is swung in either direction from said mid position to correspondingly increase the application of power to said power-transmitting element.

2. A manually operable mechanical movement comprising a manually operable lever of the first class having one free handle end; a rockable follower member; a fulcrum mounting for said manually operable lever adapting it to swing and to shift transversely of its fulcrum to vary its leverage; a pivotal mounting for said follower member supported with its axis fixed with relation thereto and with relation to said fulcrum of the latter; a pivot joint directly and operatively connecting one end of the manually operable lever to the outer shiftable end of the follower member, said pivot joint being constrained to swing around said axis of said pivotal mounting with a fixed radius and cause the shift of the manually operable lever across its fulcrum as it is swung and said offset of the pivotal mounting axis from the fulcrum center being no greater than said radius; a power-transmitting element connected to said pivot joint at the outer end of the follower member, the center of the fulcrum and the center of the fixed axis of the follower member being so related to each other that when the manually operable lever extends across said two points said lever will be in its mid position and its leverage will be increased as it is swung in either direction from said mid-position to correspondingly increase the application of power to said power-transmitting element; and means to positively limit the swing of said pivot joint at points more than one hundred and eighty degrees apart for locking said power-transmitting element past dead centers of said joint and said pivotal mounting.

3. A manually operable mechanical movement comprising a manually operable lever of the first class having one free handle end; a rockable follower member; a fulcrum mounting for said manually operable lever adapting it to swing and to shift transversely of its fulcrum to vary its leverage; a pivotal mounting for said follower member supported with its axis fixed with relation thereto and with relation to said fulcrum and laterally offset from the latter; a pivot joint directly and operatively connecting one end of the manually operable lever to the outer shiftable end of the follower member, said pivot joint being constrained to swing around said axis of said pivotal mounting with a fixed radius and cause the shift of the manually operable lever across its fulcrum as it is swung; and a power-transmitting element connected to said pivot joint at the outer end of the follower member, the center of the fulcrum and the center of the fixed axis of the follower member being so related to each other that when the manually operable lever extends across said two centers said lever will be in its position of minimum leverage and its leverage will be gradually increased as it is swung from said position to correspondingly increase the application of power to said power-transmitting element.

In testimony whereof I hereunto affix my signature.

LOUIS LEYES.